Figure 1:
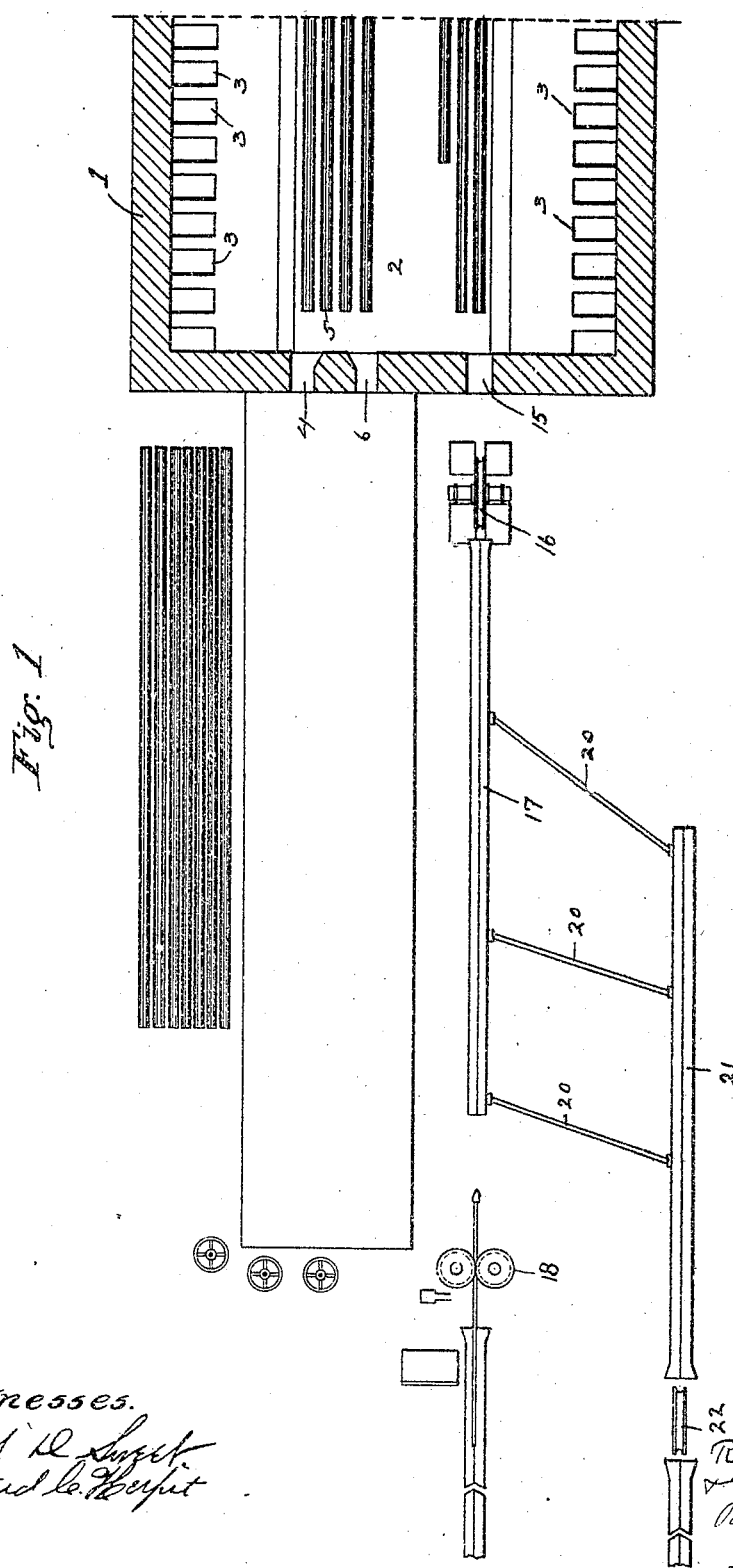

No. 774,311. PATENTED NOV. 8, 1904.
R. C. CRAWFORD & G. BAEHR.
MANUFACTURE OF LAPWELD PIPES.
APPLICATION FILED SEPT. 11, 1902.
NO MODEL. 2 SHEETS—SHEET 1.

Witnesses. Inventors

No. 774,311. PATENTED NOV. 8, 1904.
R. C. CRAWFORD & G. BAEHR.
MANUFACTURE OF LAPWELD PIPES.
APPLICATION FILED SEPT. 11, 1902.
NO MODEL.
2 SHEETS—SHEET 2.
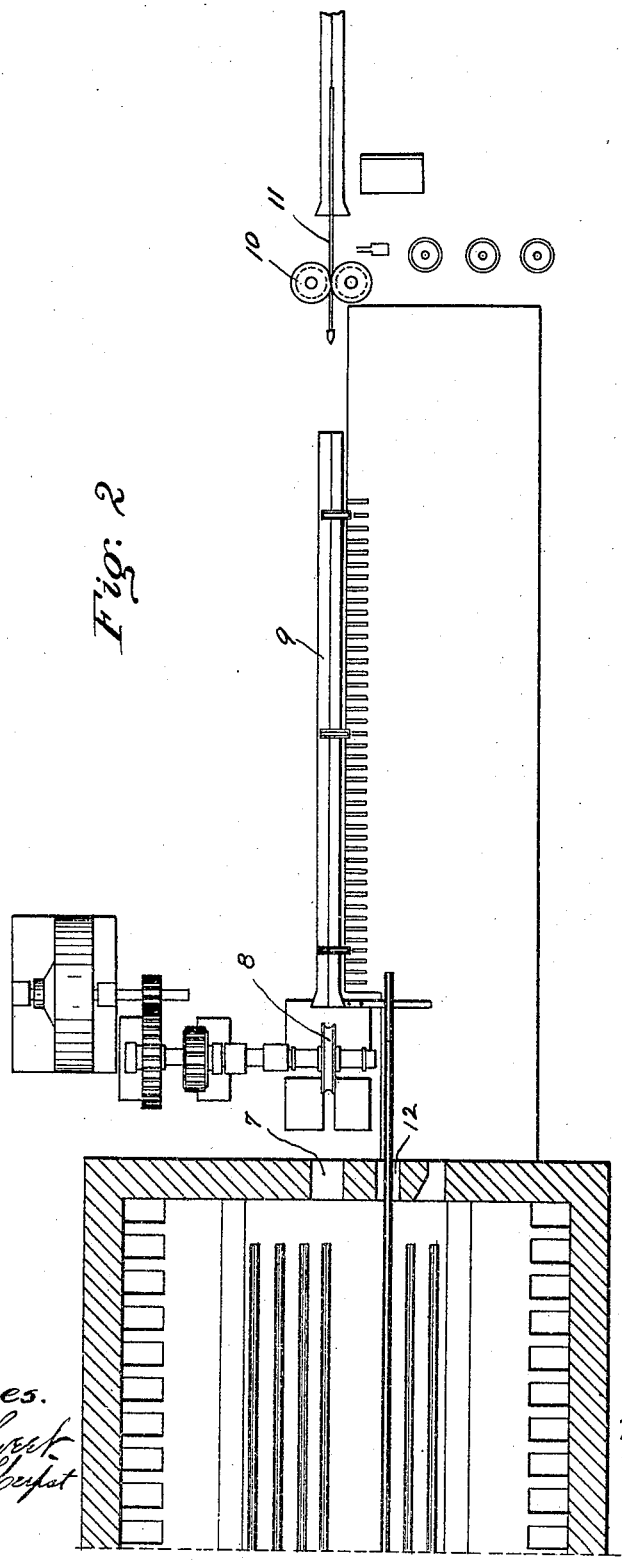

No. 774,311.

Patented November 8, 1904.

UNITED STATES PATENT OFFICE.

RUFUS C. CRAWFORD AND GEORGE BAEHR, OF McKEESPORT, PENNSYLVANIA, ASSIGNORS TO NATIONAL TUBE COMPANY, OF PITTSBURG, PENNSYLVANIA, A CORPORATION OF NEW JERSEY.

MANUFACTURE OF LAPWELD-PIPES.

SPECIFICATION forming part of Letters Patent No. 774,311, dated November 8, 1904.

Application filed September 11, 1902. Serial No. 122,991. (No model.)

*To all whom it may concern:*

Be it known that we, RUFUS C. CRAWFORD and GEORGE BAEHR, residents of McKeesport, in the county of Allegheny and State of Pennsylvania, have invented a new and useful Improvement in the Manufacture of Lapweld-Pipe; and we do hereby declare the following to be a full, clear, and exact description thereof.

Our invention relates to a method of manufacturing lapweld-tubing, and more especially to the manufacture of boiler-tubes and other lapweld-tubing which are given a second run through a furnace and welding apparatus.

The object of our invention is to provide a method of manufacturing such tubing whereby the output of the furnace is increased and the cost of operating the same reduced.

In the manufacture of boiler and similar tubes the practice heretofore has been to form the same in the ordinary way of making lapweld-tubing—that is, from the bent-up skelp which was charged into a heating-furnace, raised to a welding heat, and then pushed out of the furnace through welding-rolls and over a ball. This operation completes the welding of the usual lapweld-tubing; but for use as boiler-tubes and elsewhere where greater strength is required it is necessary to give such tubes a second run through the furnace and welding apparatus. The usual practice is to operate the furnace for half a day on the first run, the tubes as they are welded being laid aside and permitted to cool, and then for the other half of the day the furnace is operated on the second run—that is, the welding-rolls are readjusted to the necessary size and the previously-welded tubes are charged into the furnace, again raised to a welding heat, and pushed out of the same and through the welding-rolls and over the ball. According to this practice the output of the furnace is limited to half a day's run and is about six hundred tubes per day, this being the number which can be given the first run in the forenoon and the second run in the afternoon. The only way of increasing this output under the old method would be by having two furnaces, one for giving the first run and another for giving the second run, the tubes being transferred from the first furnace to the second. This, however, would necessitate the building of two furnaces and providing independent charging and welding apparatus for each of said furnaces, besides requiring two complete crews of eleven men each, so that while by means of such furnaces the output of the present single furnace would be practically doubled the expense would also be practically doubled and no saving would result.

The object of our invention is to provide a method of forming lapweld-tubing which must be given two runs, whereby the output can be increased without a corresponding increase in cost.

To this end it consists in forming the lapweld-tubing in the ordinary way and then, preferably before the same has cooled, recharging the welded tube into the same furnace and after reheating the same giving it a second run through welding-rolls.

Our invention also consists in so handling the tube that the end presented to the second set of welding-rolls is not the same as that presented to the first set of welding-rolls, thus preventing tapering the walls of the tube and presenting a more perfect end to the second pair of welding-rolls.

Our invention also comprises details of arrangement, as will hereinafter appear.

The accompanying drawings show a plan view illustrating diagrammatically apparatus for carrying out our invention, Figure 1 of said drawings being a plan view of the rear half of the furnace, and Fig. 2 a similar view of the front half of the furnace.

The furnace employed may be of any approved type, but preferably being heated by gas and of the regenerative type. Such a furnace is shown at 1, and it has the usual side, end, and top walls and is provided with a hearth 2 and regenerator-ports 3. The hearth 2 will be made somewhat wider than in the ordinary lapweld-furnace, so as to contain in addition to the necessary number of skelp also a number of tubes for reheating preparatory to being given the second run. This furnace is provided at its rear end with openings 4, through which the skelp 5 are charged into the furnace, said skelp preferably being charged in on one side of the hearth and as they heat are rolled over toward the center of the furnace and a fresh skelp charged into the vacant space, as is now the custom. The rear of the furnace is also provided with openings 6 for insertion of a suitable bar or fork for pushing the skelp out of the front end of the furnace and into the welding-rolls. The front end of the furnace is provided with a withdrawing-opening 7, through which the heated skelp are pushed on their way to the welding-rolls 8. These rolls are or may be of any desired construction and driven in any suitable way, and in line therewith is the usual trough 9 for receiving the tube and the rolls 10 for projecting and withdrawing the mandrel-bar 11, which supports the ball over which the skelp is welded. All of these parts are of the usual construction and form no part of our invention, and the precise arrangement shown is illustrative merely.

In carrying out our invention the front end of the furnace will be provided with a recharging-opening 12 at the side of the withdrawing-opening 7. The rear end of the furnace will be provided with a withdrawing-opening 15, and in line therewith will be another pair of welding-rolls 16, trough 17, mandrel-bar-operating rolls 18, and mandrel-bar and ball, all of which are or may be precisely the same as the welding-rolls, trough, and mandrel first described. At one side of the welding-trough 17 are inclined ways 20, leading to the sizing-trough 21 in line with the sizing-rolls 22 and which may be constructed in the usual way.

The foregoing are all of the essential parts of apparatus necessary for carrying into effect our invention, and in the practice thereof the skelp 5 are charged through the opening 4, and as they heat they are progressively rolled over toward the center of the furnace until in line with the withdrawing-opening 7. When the edges of the skelp are raised to a good welding heat, they are pushed out in succession through the opening 7 and into the welding-rolls 8, through which they are passed over the ball in the usual way, also passing over the mandrel-bar 11 in the trough 9. As soon as the tube has cleared the welding-rolls the mandrel-bar will be withdrawn in the usual way, and then said tube is transferred in any suitable way or by means of any suitable transferring device or mechanism sidewise and recharged, with its rear end foremost, back into the furnace through the charging-opening 12, and as it heats it will be rolled over sidewise until in line with the withdrawing-opening 15. As soon as again raised to a good welding heat it is pushed out of the furnace through the opening 15 into the rolls 16 and over the ball in the usual way. It is then transferred to the sizing-trough 21 and goes to the sizing-rolls 22 and thence to the straightening-rolls, according to the usual practice. It will be observed that the arrangement is such that the end of the tube which last passes through the first set of welding-rolls is presented to the second set of welding-rolls. As the front end of the tube is always more or less irregular, this arrangement gives a better end for presentation to the second set of welding-rolls. Furthermore, by reason of the accumulation of cinder on the ball the walls of the tube are usually somewhat thinner at the rear end than at the forward end, giving a slight taper thereto; but by giving the tube a second run in the direction opposite to that in which it travels during the first run this tapering effect is almost entirely overcome.

By our method the tube is recharged into the furnace before it has lost an appreciable amount of heat, so that very little heat is necessary to again bring it to proper welding temperature. As a consequence the furnace can be operated at but a slight cost over the cost of operating the present furnaces for giving a single run. Furthermore, only three or four workmen will be required in addition to the eleven usually employed for a single crew, and the output of the furnace will be nearly doubled. The product is therefore greatly cheapened.

What we claim as our invention, and desire to secure by Letters Patent, is—

1. The method of making lapweld-tubing, which consists in charging in succession a series of bent-up skelp into a furnace onto one zone of the hearth thereof, raising their edges to a welding heat, passing them in succession through welding-rolls and over a mandrel, then while still at a high heat recharging the tubes in succession onto another zone of the same hearth and reheating the same, and then giving them in succession a second pass through welding-rolls and over a mandrel, whereby a continuous double-welding process is carried on.

2. The method of making lapweld-tubing, which consists in charging in succession a series of bent-up skelp into a furnace onto one zone of the hearth thereof, moving the same laterally thereon until their edges are raised to a welding heat, withdrawing them in succession from the furnace and passing them through welding-rolls and over a mandrel, recharging the tubes in succession while still at a high heat onto another zone of the same furnace-hearth, moving them laterally on said hearth until again raised to a welding heat, and then giving them a second pass in succession through welding-rolls and over a mandrel, whereby a continuous double-welding process is carried on.

3. The method of making lapweld-tubing, which consists in charging the bent-up skelp into a furnace, raising its edges to a welding heat, withdrawing it through the front end of the furnace and passing it through welding rolls and over a mandrel, transferring the tube sidewise, recharging it while still at a high heat and rear end foremost into the furnace through the front end thereof, moving it sidewise in the furnace until raised to a welding heat, and then withdrawing it through the rear end of the furnace and giving it a second pass through welding-rolls and over a mandrel and in the opposite direction from that in which it was given the first welding pass.

4. The method of making lapweld-tubing, which consists in charging the bent-up skelp into a furnace, raising its edges to a welding heat, passing it through welding-rolls and over a mandrel, recharging the tube while still at a high heat into the same furnace rear end foremost and reheating the same, and then pushing the same out of the opposite end of the furnace rear end foremost and giving the same a second pass through welding-rolls and over a mandrel and in the opposite direction from that in which it was given the first welding pass.

5. The method of making lapweld-tubing, which consists in charging the bent-up skelp into a furnace through the rear end thereof, gradually moving the same over toward the center thereof, withdrawing the same through the front end of the furnace and passing it through welding-rolls and over a mandrel, transferring it laterally and recharging it rear end foremost into the same furnace through the front end thereof, again gradually moving the same laterally in the furnace, and then withdrawing the same through the rear end of the furnace rear end foremost and giving it a second pass through welding-rolls and over a mandrel and in the opposite direction from that in which it was given the first welding pass.

In testimony whereof we, the said RUFUS C. CRAWFORD and GEORGE BAEHR, have hereunto set our hands.

RUFUS C. CRAWFORD.
    GEORGE BAEHR.

Witnesses:
 R. T. CAROTHERS,
 W. D. MANSFIELD.